No. 758,557. Patented April 26, 1904.

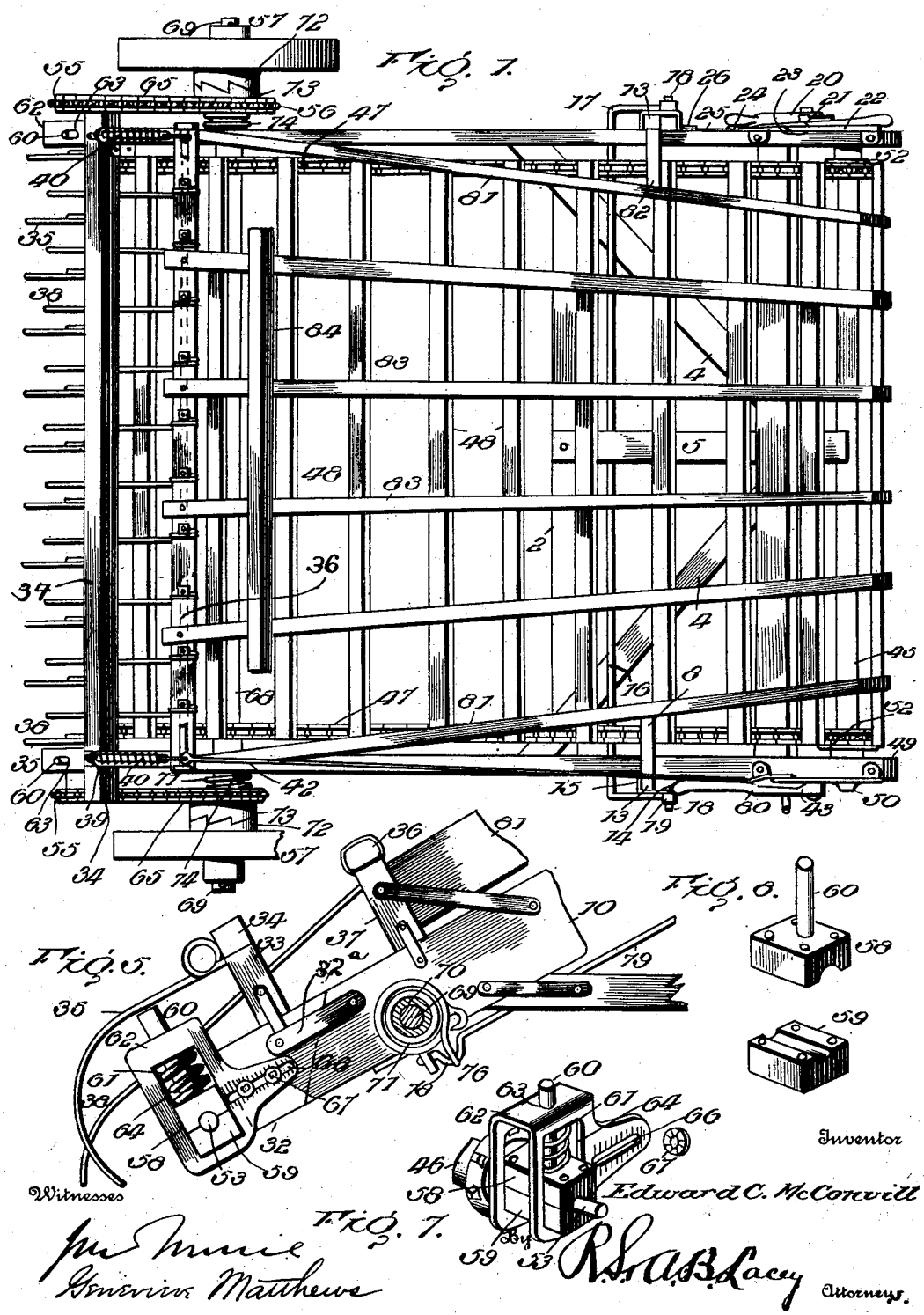

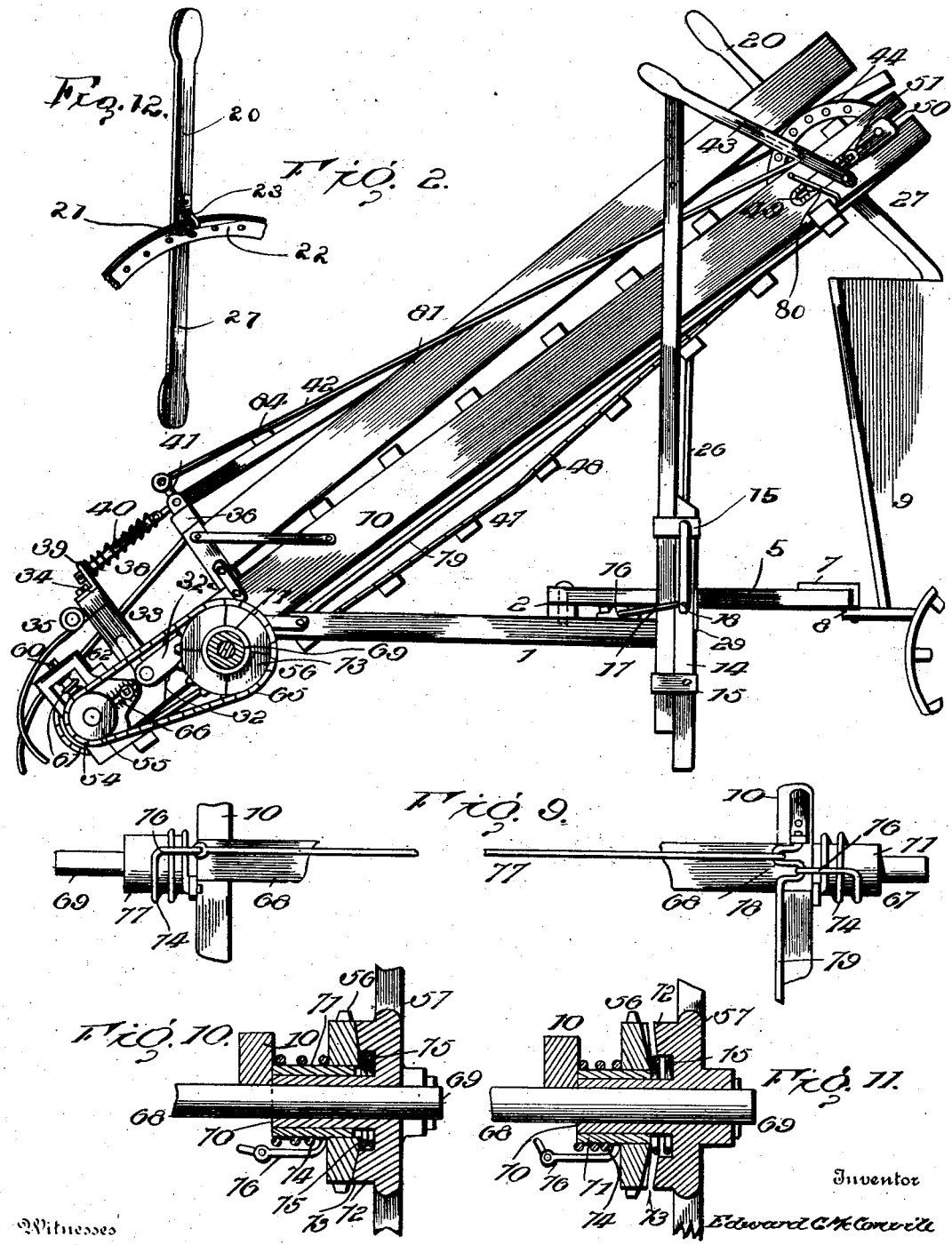

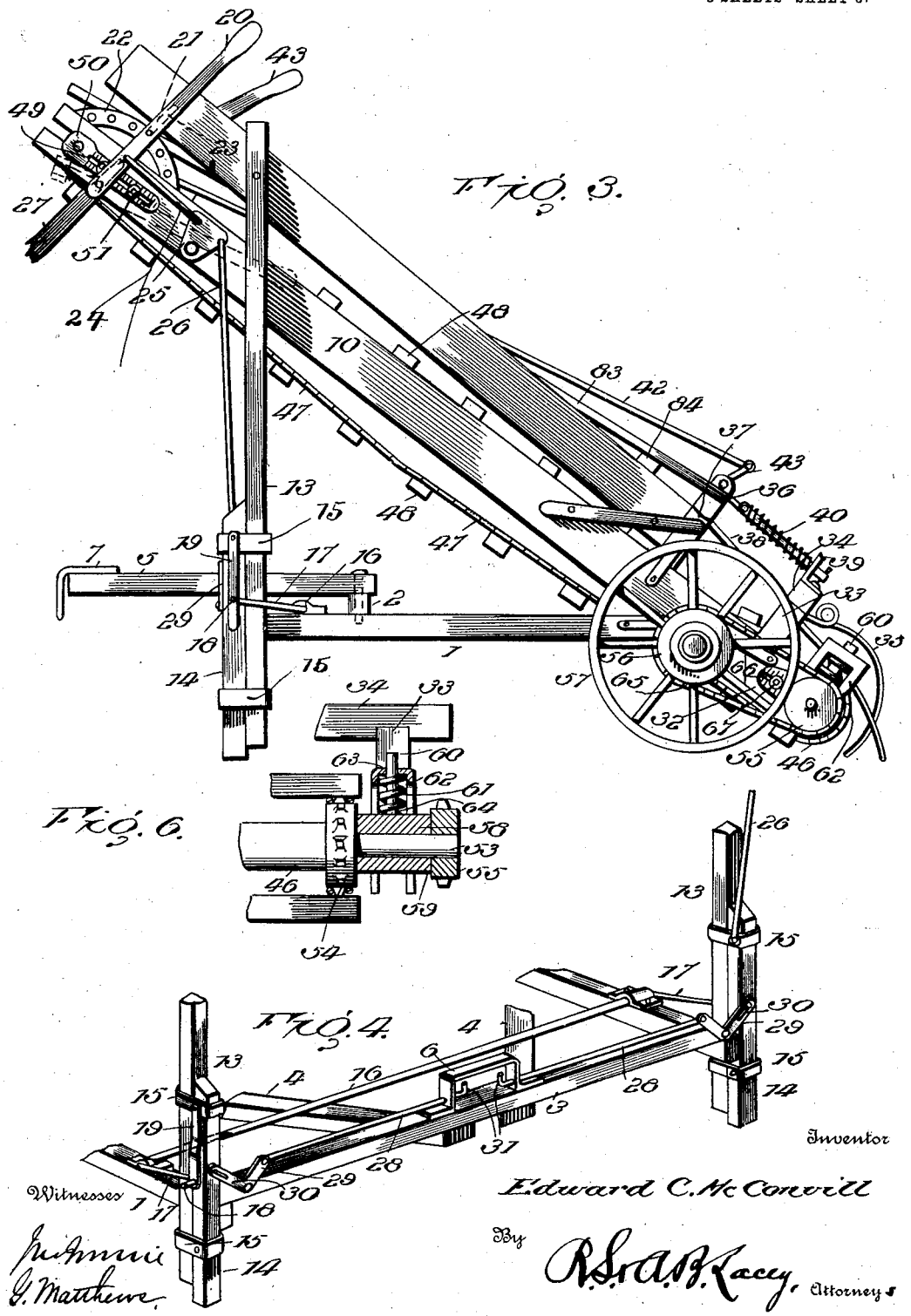

UNITED STATES PATENT OFFICE.

EDWARD C. McCONVILL, OF OMAHA, NEBRASKA.

HAY-LOADER.

SPECIFICATION forming part of Letters Patent No. 758,557, dated April 26, 1904.

Application filed July 14, 1903. Serial No. 165,456. (No model.)

*To all whom it may concern:*

Be it known that I, EDWARD C. MCCON-VILL, a citizen of the United States, residing at Omaha, in the county of Douglas and State of Nebraska, have invented certain new and useful Improvements in Hay-Loaders, of which the following is a specification.

This invention relates to machines for gathering hay, straw, and the like and loading it into a rack or wagon, the purpose being to combine with the operating parts novel mechanisms and connections whereby the machine is wholly subservient to the will of the attendant and can be coupled to or uncoupled from the wagon either from the ground or from the load.

A further purpose of the invention is to mount the rake independently of the elevator-frame, so it can rise and fall either automatically to clear obstructions or at will of the operator and to have the mountings carry the lower roller of the elevator, which in turn is mounted so as to yield and prevent injurious contact of the lower end of the elevator with the ground.

A further purpose of the invention is to improve the general construction of the class of machines aforesaid and increase their usefulness and adaptability for work under varying conditions of soil and crop.

The invention also consists of the novel features, details of construction, and combination of the parts, which hereinafter will be more fully disclosed and finally claimed, and for this purpose and also to acquire a knowledge of the merits of the invention and the structural details of the means whereby the results are attained reference is to be had to the appended description and the drawings hereto attached.

While the essential and characteristic features of the invention are necessarily susceptible of modification, still the preferred embodiment of the invention is illustrated in the accompanying drawings, in which—

Figure 1 is a top plan view of a hay-loader embodying the invention. Fig. 2 is a side elevation. Fig. 3 is a view of the reverse side. Fig. 4 is a detail perspective view of the means for coupling and uncoupling the loader from the rack. Fig. 5 is a detail view in elevation of the rear portion of the frame, showing more particularly a set of mountings for the rake, lower roller, and the joint between the part carrying the said mountings and the frame. Fig. 6 is a detail view of an end portion of the lower elevator-roller and the part coöperating therewith. Fig. 7 is a detail view in perspective of the frame or hanger for the lower roller of the elevator, showing the means for securing it in an adjusted position. Fig. 8 is a detail view in perspective of the movable bearing, the parts being separated. Fig. 9 is a detail view of the instrumentalities for throwing the clutches between the drive-wheels and the power-transmitting mechanisms out of gear. Fig. 10 is a detail section of an end portion of an axle, showing the mountings for a drive-wheel, a gear element, and the adjunctive parts. Fig. 11 is a view of the parts shown in Fig. 10, illustrating their relation when the elements of the clutch are out of gear. Fig. 12 is a detail view of the operating-lever for the elevating mechanism and the detent means coöperating therewith.

Corresponding and like parts are referred to in the following description and indicated in all the views of the drawings by the same reference characters.

The structure for supporting the operating parts comprises an elevator-frame and a draft or wheel frame, the two frames occupying a relatively acute angular position. The draft or wheel frame comprises side bars 1, spaced transverse bars 2 and 3, and braces 4. A pole or tongue 5 is pivotally connected at its rear end to the transverse bar 2 and passes through a keeper 6, applied centrally to the top side of the bar 3, and is supplied at its front end with a hook 7 to engage with a staple 8 or like device applied to the rack or body portion of a wagon 9. The elevator-frame comprises side bars 10, inclining upwardly and forwardly from the side bars 1. Posts 13 connect the forward ends of the side bars 1 with the side bars 10 and project a short distance beyond the respective bars for a purpose presently to be described.

The following instrumentalities are provided for coupling and uncoupling the loader to the rack or wagon into which the hay, straw, or the like is to be deposited, the same consisting of push-bars 14, slidably mounted with reference to the posts 13 and held thereto by cuffs or bands 15. A rock-shaft 16 is mounted in bearings applied to the forward portions of the side bars 1, and its ends are bent to provide arms 17 and wrists 18, the latter being connected by links 19 with the upper portions of the push-bars 14. By this means the push-bars are simultaneously actuated, motion being imparted to one and being transmitted to the other through the intervention of the rock-shaft 16 and its connections with the push-bars. A lever 20 is fulcrumed to the front end of a side bar 10 and projects vertically and carries a pin 21 to coöperate with any one of a series of openings formed in a segment 22, secured to the bar 10, concentric with the fulcrum of the lever 20. A spring 23 is secured to the lever 20, and its free end bears against the opposite side of the segment 22 and holds the pin 21 in engagement with the opening of the segment into which it is permitted to enter. A rod 24 connects the lever 20 with a bell-crank 25, applied to the bar 10, supporting the said lever, and a second rod 26 connects the bell-crank with the adjacent push-bar 14. By pushing the upper end of the lever 20 toward the rear of the loader the lower ends of the bars 14, if not already resting upon the ground, are carried beyond the lower extremities of the posts 13 into contact therewith, and the frame of the loader is correspondingly elevated, whereby the hook 7 at the coupling end of the pole or tongue 5 is carried above the staple 8, applied to the rack or wagon, and when the hook is positioned so as to engage with said staple a reverse movement of the lever 20 permits the frame of the loader to descend and the hook 7 to make engagement with the staple, whereby the coupling of the loader to the rack is effected and the bars 14 elevated from the ground. Should it be required to detach the loader from the rack at any time, it is only necessary to operate the lever 20 in the manner stated. The coupling and uncoupling may be effected from the ground by means of a second lever 27, which is mounted upon the same fulcrum with the lever 20 and is connected so as to move therewith. This lever 27 occupies a pendent position and extends within convenient reach, so as to be grasped by the operator when standing upon the ground.

The keeper 6, secured centrally to the transverse bar 2, is of such length as to admit of the pole or tongue 5 having lateral play at its coupling end, whereby said pole can be swung either to the right or to the left to make engagement with the staple or like device 8 when the loader and wagon are not on perfect alinement. When the hay-loader is in position for operation, it is desirable to prevent lateral swing of the pole or tongue, and for this purpose the following means have been devised, and consist, essentially, of rods or bars 28, extending about parallel with the transverse bar 3 and having their inner ends passing through openings in the vertical parts of the keeper 6 and their outer ends connected to short arms of bell-crank levers 29, pivoted to the outer ends of the transverse bar 3. The long arms of the bell-cranks 29 are slotted, as shown at 30, and receive fastenings by means of which they are connected to the push-bars 14. The connections are so proportioned that when the pole or tongue 5 is coupled to the rack or wagon and the latter and the loader are in longitudinal alinement the inner ends of the rods 28 will bear against opposite sides of the pole and prevent any lateral movement thereof. The inner ends of the rods or bars 28 are bent, as shown at 31, so as to obtain an extended bearing against the sides of the pole to prevent a too rapid wearing away thereof.

The bars 1 and 10 are rigidly connected at their rear ends, and the lower extremities of the bars 10 are beveled to match with the corresponding beveled ends of short bars 32, hinged or pivotally connected at their front ends to the rear ends of the bars 10. As shown, links 32$^a$ have pivotal connection at their ends with, respectively, the bars 10 and 32, so as to admit of the pivotal movement of the bars 32. The bevel-joint formed between the bars 10 and 32 provides an extended bearing, which is desirable to support the parts carried by the bars 32 when occupying a normal position or alining with the bars 10. Posts 33 project upwardly from the bars 32, and the rake-head 34 is secured to their upper ends, the teeth or tines 35 curving rearwardly and downwardly and being secured at their upper ends to the head 34 in any convenient and substantial manner. The rake comprising the head 34 and teeth 35 gathers the hay, straw, or the like as the machine is drawn over the field and lifts it sufficiently to be engaged by the elevator, which carries it upward and forward to the rack or wagon having the loader in tow. The rake is adapted to rise automatically to clear obstructions and can be lifted at the will of the operator.

A cross-bar 36, extending parallel with the rake-head 34, is secured to the upper ends of posts 37, projecting upwardly from the rear ends of the bars 10. Compressors 38 are secured at their upper ends to the cross-bar 36 and curve rearwardly and downwardly and are preferably constructed of lengths of spring-wire of sufficient gage to hold the hay or straw upon the elevator during the initial lifting operation. These compressors span the space formed between the cross-bar 36 and rake-head 34 and cause the hay or the like to remain upon the lower portion of the elevator. A bracket 39 is secured to an end portion of the rake-head 34, and its upright portion is apertured to receive a bolt or pin 40, which passes loosely therethrough and is provided at its rear end with a stop to prevent disengagement of the bolt from the bracket when forward movement is imparted thereto. A bell-crank lever 41 is fulcrumed to the corresponding end of the cross-bar 36, and its horizontal arm is loosely connected with the front end of the bolt 40, and its vertical arm is connected, by means of a rod 42, with a lever 43, at the upper forward end of the side bar 10, on the same side of the machine with the bolt 40 and adjunctive parts. This lever 43 coöperates with a segment 44 in a manner similar to the lever 20 and segment 22, so as to hold the rake-head at any elevation within the range of its vertical movement. When the short bars 32 have their free ends at the lowest position, they can move freely to permit the rake to ride over any obstruction, since the bracket 39 can ride forward upon the bolt 40 without causing any movement of the lever 43 or any strain upon the parts 41 and 42.

The elevator, which may be of any construction, is of the endless type, and is supported at its upper end upon a roller 45 and at its lower end by means of a roller 46, and comprises endless chains 47 and transverse slats 48, the latter being secured to certain links of the chains in transverse alinement. The upper ends of the side bars 10 are slotted, as shown at 49, to receive the journals of the roller 45, which are mounted in bearings of plates 50, adjustably connected to the sides of the bars 10. These plates 50 are longitudinally slotted, and their outer sides are serrated or toothed to coöperate with correspondingly-toothed washers 51, by means of which the bearing-plates are positively held in an adjusted position, it being understood that the washers and plates are secured to the side bars 10 in an adjusted position by means of bolts or like fastenings, the latter operating in the slots of the said plates. Flanged pulleys 52 are applied to the end portions of the roller 45, and the endless chains of the elevator pass therearound and are supported directly thereby.

The lower roller 46 receives a shaft 53, which passes therethrough and whose ends project beyond the extremities of the roller and receive corresponding sprocket-wheels 54 and 55, the inner sprocket-wheels 54 receiving the endless chains 47 of the elevator and imparting positive movement thereto and the outer sprocket-wheels 55 being connected directly with corresponding sprocket-wheels 56, receiving motion directly from the drive-wheels 57. The sprocket-wheels 54 and 55 are secured to the shaft 53, so as to rotate therewith. The shaft 53 is mounted in bearings capable of vertical movement with reference to the bars 32 to enable the lower end of the elevator to rise, so as to clear any obstruction in its path and avoid injury thereto. The bearing at each end of the shaft 53 is composed of an upper box 58 and a lower box 59, the two boxes being bolted together. This construction of bearing is essential in order to enable the proper assembling of the parts, as will appear more fully hereinafter. A stem 60 is applied to the box 58 and supports a coil-spring 61, by means of which the bearing is held at its lowest position with its supporting frame or hanger. The frame or hanger 62 has adjustable connection with the lower or outer end of the bar 32 and is composed of spaced side members connected at their upper ends, the connecting portion having an opening 63 to receive the upper end of the stem 60. The side members of the frame are slotted, as shown at 64, to receive the end portions of the adjustable bearing. The coil-spring 61 is confined between the top side of the bearing and the part of the frame 62, connecting its side members. In this connection it is to be noted that each bar 32 will be provided with a frame 62 and adjunctive parts, as herein described. By having the frames 62 adjustably connected with the lower ends of the bars 32 any slack occurring in the drive-chains 65 can readily be taken up. The forward ends of the side portions of each frame 62 are slotted, as shown at 66, and the outer sides adjacent to the slots are roughened or toothed to coöperate with correspondingly-toothed washers 67, so as to secure the frame when positioned against casual displacement, the parts being made fast by bolts in the usual manner, as will be readily comprehended. An axle 68 is secured to the lower rear portion of the frame and its ends project and form spindles 69, upon which the drive-wheels 57 are loosely mounted, said drive-wheels being provided with inner tubular extensions 70 to obtain an extended bearing upon the spindles and which enter hollow gudgeons 71, secured at their inner ends to the side bars 10 and projecting laterally therefrom concentric with the spindles 69. A half-clutch 72 is formed upon the inner side of each drive-wheel and is adapted to coöperate with a corresponding half-clutch 73 upon the outer face of each drive-sprocket 56, the latter being loosely mounted upon its respective hollow gudgeon 71. The drive-chains 65 connect the drive-sprockets 56 with the sprocket-wheels 55 and transmit rotary motion thereto. A coil-spring 74 is mounted upon the inner end of each hollow gudgeon 71 and exerts an outward pressure against the adjacent drive-sprocket 56 and serves to hold the half-clutches 72 and 73 in engagement. A spring 75 is mounted upon the outer end of each hollow gudgeon and normally tends to separate the parts 72 and 73 and throws the elevator out of gear when the force of the springs 74 is overcome.

The outer end of each spring 74 is bent inward, as shown at 76, and has connection either directly or by means of a rod 77 with a crank portion 78 of a shaft 79, journaled to one of the side bars 10 and provided at its upper end with a handle 80, by means of which said shaft can be turned in its bearings to compress the spring 74 and permit the springs 75 to come into play and throw the elevator out of action by unshipping the clutch elements 72 and 73. The inner springs 74 are superior in strength to the outer springs 75 and when relieved from any restraining influence overcome the force of the springs 75 and throw the elevator into gear by causing the clutch elements 72 and 73 to intermesh.

Guards 81 are located at the sides of the elevator and incline inwardly toward their upper ends, their lower ends being spaced apart a distance corresponding to the distance between the side bars 10. The purpose of the guards 81 is to gradually reduce the width of the hay or straw as it moves upward under the influence of the elevator, thereby preventing the same from dropping over the sides of the rack or wagon when elevating the upper end of the loader. The lower ends of the guards 81 are secured to the lower portions of the side bars 10 and posts 37 by means of strap-irons, and their upper portions are connected by brackets 82 to the upper projecting ends of the posts 13.

A frame overhangs the elevator to hold the hay or straw in intimate contact therewith, and consists of a series of bars 83, secured at their lower ends to the cross-bar 36 and connected by means of a transverse bar 84, located a short distance from the cross-bar 36. The upper ends of the bars 83 are free and have a tendency toward the plane of the elevator so as to gradually compress the hay or straw in its upward movement.

Having thus described the invention, what is claimed as new is—

1. In a hay-loader or the like, a laterally-movable pole or tongue, elevating means for raising and lowering the frame carrying the said pole or tongue, and holding means for securing the pole or tongue in a given position and connected with the elevating means for simultaneous operation therewith, substantially as described.

2. In a hay-loader or the like, a laterally-movable pole or tongue, elevating means for raising and lowering the frame carrying the said pole or tongue, laterally-movable devices at the sides of the pole or tongue, and independent connections between the said laterally-movable devices and opposite parts of the elevating means, substantially as and for the purpose described.

3. In combination with a hay-loader or the like, a pivoted pole or tongue, a keeper for limiting the swinging movements of said pole and assisting in holding it in place, rods or bars located at opposite sides of the pole and slidably mounted in the vertical or end portions of the keeper, and means for simultaneously moving said rods in opposite directions either to release or to fix the position of the pole, substantially as set forth.

4. In combination, a laterally-movable pole or tongue, oppositely-disposed rods or bars adapted to have their inner ends bear against opposite sides of the said pole, levers of approximately bell-crank form connected with the said rods, and means for simultaneously actuating said levers, substantially as specified.

5. In combination, a laterally-movable pole or tongue, holding means at the sides of the pole, levers of approximately bell-crank form having one member connected with the respective elements of the said holding means, vertically-movable bars having loose connection with the other member of the aforementioned levers, and actuating means for the said bars, substantially as set forth.

6. In combination, a laterally-movable pole or tongue, a keeper for limiting the movements thereof, rods or bars having their inner ends slidably related with reference to the end portions of said keeper and adapted to bear against opposite sides of the said pole, vertically-movable bars operatively connected with the said rods to effect a longitudinal movement thereof, means connecting the said bars for simultaneous action, and operating means applied to one of the bars, substantially as set forth.

7. In combination, a pivoted pole or tongue, rods or analogous devices located at opposite sides of the said pole, vertically-movable push-bars, bell-crank levers or the like connecting the push-bars with the aforesaid rods, a rock-shaft having crank-arms connected with the push-bars to effect a simultaneous movement thereof, and means for operating the push-bars, substantially as specified.

8. In combination, a pivoted pole or tongue, a keeper therefor, oppositely-extending rods having their inner ends slidably mounted in the end portions of the keeper and bent to engage with opposite sides of the pole, vertically-movable push-bars, bell-crank levers connecting the push-bars with the aforesaid rods, a rock-shaft having crank-arms connected by links with the push-bars, and means for operating one of the push-bars, substantially as set forth.

9. In a hay-loader, the combination with the frame and a rake pivotally connected to the frame, of a bracket applied to the rake-head, a bell-crank lever mounted upon the frame of the loader, a bolt passing loosely through the said bracket and having a stop to engage therewith and having pivotal connection with the horizontal arm of the bell-crank lever, a spring mounted upon the bolt and confined between a stop thereof and the aforesaid bracket, and an operating-lever attached to the vertical arm of the bell-crank lever, substantially as and for the purpose specified.

10. In a hay-loader, the combination of short bars having pivotal connection with the loader-frame, an elevator, a roller forming a support for the lower portion of the elevator, yieldable mountings for the said roller applied to the pivotal bars, a rake attached to the pivotal bars and movable therewith, an operating-lever, and a spring-and-stop connection between the rake-head and loader-frame and connected with the operating-lever, substantially as described.

11. In a hay-loader, the combination of short bars having pivotal connection with the loader-frame, a roller, yieldable mountings for said roller applied to the pivoted bars, an elevator having its lower portion supported by means of the said roller, a rake carried by the pivoted bars, an elevated cross-bar attached to the loader-frame, a spring-and-stop connection between the rake-head and elevated cross-bar, and compressors attached to the elevated cross-bar and passing between the rake and the elevator, substantially as described.

12. In a hay-loader, the combination of short bars having pivotal connection with the loader-frame, a roller, yieldable mountings for said roller applied to the pivoted bars, an elevator having its lower portion supported by means of the said roller, a rake carried by the pivoted bars, an elevated cross-bar attached to the loader-frame, a spring-and-stop connection between the rake-head and elevated cross-bar, compressors attached to the elevated cross-bar and passing between the rake-teeth and the elevator, and spaced bars attached to the said elevated cross-bar and overlying the elevator, substantially as described.

In testimony whereof I affix my signature in presence of two witnesses.

EDWARD C. McCONVILL. [L. S.]

Witnesses:
F. F. ROOSE,
J. W. CARLSON.